May 3, 1966 C. A. PAGE 3,249,927
TRANSDUCER METHOD AND APPARATUS
Filed Feb. 13, 1961 5 Sheets-Sheet 1

INVENTOR.
CALVIN A. PAGE
BY
*Charles L. Johnson Jr.*
ATTORNEY

May 3, 1966  C. A. PAGE  3,249,927
TRANSDUCER METHOD AND APPARATUS
Filed Feb. 13, 1961  5 Sheets-Sheet 4

INVENTOR.
CALVIN A. PAGE
BY Charles L. Johnson Jr.
ATTORNEY

May 3, 1966  C. A. PAGE  3,249,927
TRANSDUCER METHOD AND APPARATUS
Filed Feb. 13, 1961  5 Sheets-Sheet 5

INVENTOR.
CALVIN A. PAGE
BY Charles J. Johnson Jr.
ATTORNEY

United States Patent Office 3,249,927
Patented May 3, 1966

3,249,927
TRANSDUCER METHOD AND APPARATUS
Calvin A. Page, Dover, N.J., assignor to Monroe International Corporation, a corporation of Delaware
Filed Feb. 13, 1961, Ser. No. 88,786
12 Claims. (Cl. 340—174.1)

This invention relates generally to magnetic drum recording and reproducing devices and more particularly to an improved magnetic drum recording system employing a single turn record head.

In many electronic systems it is desirable to store information and to retrieve this information at a subsequent point in time for operational or computational purposes. In the fields of high speed digital computation, pulse code communication, and information correlation in particular, the foregoing storage requirements are further complicated by the fact that the stored information must be periodically presented at cyclically repetitive points in time, and with relatively short access times, the term access time being utilized in the art to denote the maximum interval which must be waited before the desired information is against presented at the output of the memory unit.

As a result of the foregoing factors, it has become common practice to employ as a memory unit a rotatable drum whose periphery is magnetizable, and a plurality of magnetic writing and reading transducers positioned adjacent to the periphery of the drum for sequentially writing signals on the drum or for reading signals from the drum; the terms writing and reading respectively denote the conversion of applied electrical signals to magnetized cells on the drum, and the generation of electrical output signals corresponding to the magnetization of the cells passing beneath a transducer. For purposes of simplicity, the term recording will hereinafter be considered generic to both reading and writing operations, since in practice a transducer may be utilized to either read or write, as desired, and the functional use implies no structural difference.

In its most common form, a magnetic drum memory unit employs a drum whose periphery is coated with either iron oxide or nicket cobalt, and one or more transducers spaced from the drum periphery.

The transducers are also usually positioned axially, with respect to the drum, over one or more parallel tracks or channels on the drum, where the term track or channel denotes a reference circle on the drum periphery which continuously passes beneath the transducers associated with that particular track. In the prior art several different forms of magnetic transducers have been found acceptable for use with magnetic drums, the most common form being a toroidal-shaped core of magnetic material which carries an electrical coil or winding remote from the core gap, the gap in the core being positioned adjacent to the associated drum track. In writing signals on the drum, therefore, energization of the transducer winding creates a magnetic field at least part of which bridges the core gap by way of the adjacent drum periphery. Conversely, in reading signals from the drum, a portion of the flux produced by the magnetized cells on the drum channel bridges through the transducer core and thereby generates an electrical output signal in the associated transducer winding.

Although the magnetic drum memory systems of the prior art have performed satisfactorily in most applications, some serious limitations still exist. One important limitation is the density or number of signals that may be recorded in a given distance of drum surface. Presently, most transducers are limited to approximately one hundred bits or signals per inch of record track.

The present invention provides a magnetic drum transducer arrangement which removes the above limitations by providing means for substantially increasing the recording density. The realization of four hundred bits to the inch have been successfully recorded and read back without error and densities of as high as 3200 bits/inch are visualized.

It is therefore an object of the invention to provide an improved method and apparatus for recording.

It is a further object of the invention to provide high density record apparatus including a transducer having a single turn winding.

It is a still further object of the invention to provide high density transducer apparatus having relatively small secondary and magnetic core components and relatively close transducer to drum spacing.

It is a yet further object of this invention to provide a high density record system including circuitry for controlling the amplitude of the record current.

An important feature of the invention involves arranging a transducer core and conductor of substantially equal thickness in such a way that the distance from the transducer to the record drum is approximately equal to the thickness of the core and conductor.

One feature of the invention includes the use of a transducer secondary winding which is from .000125–.001 inch thick and has a cup-shaped core member from .000125–.001 inch thick substantially surrounding the secondary winding so as to provide megacycle recording frequency.

Another feature of the invention includes the use of circuitry which controls the amplitude of the current through the record head to thereby provide consistent recording while protecting the more sensitive portions of the record system.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

Figure 1:
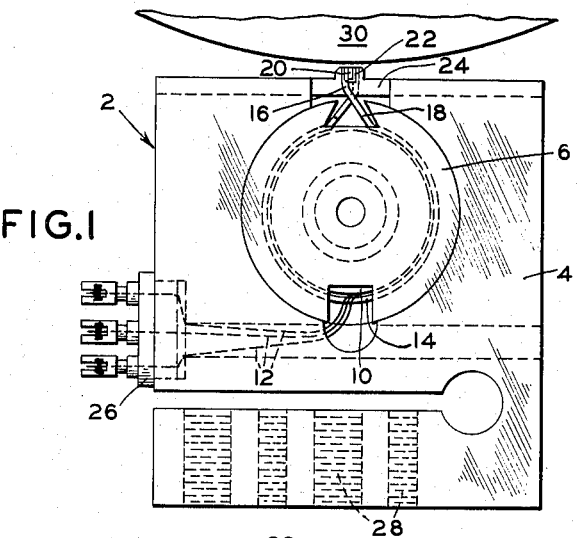
FIG. 1 is a side elevation view of the transducer and drum showing the relative placement of parts.
Figure 2:
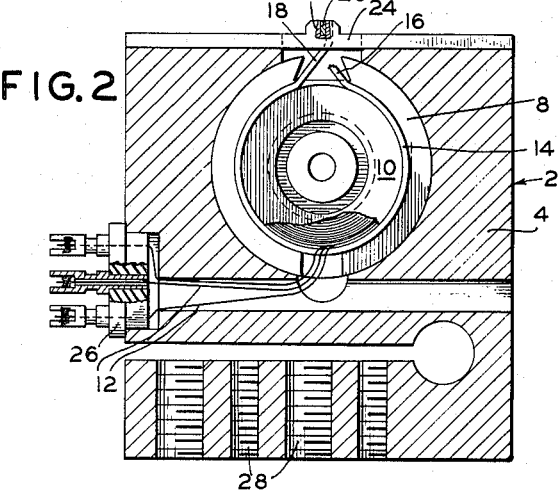
FIG. 2 is a cross-sectional view of the transducer of FIG. 1.
Figure 4:
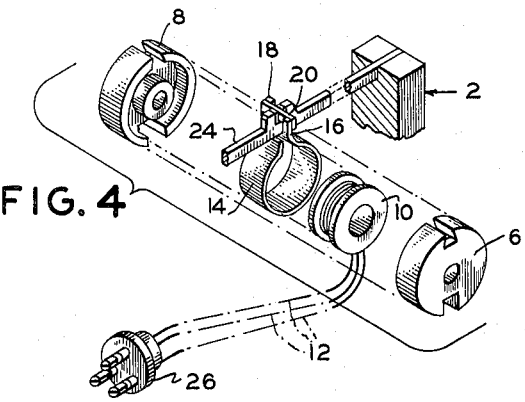
FIG. 4 is an exploded perspective view of the transducer.
Figure 3:
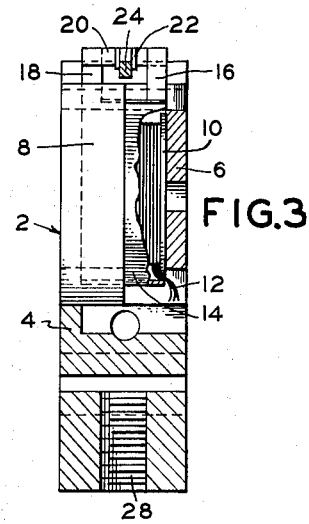
FIG. 3 is a partial cross-sectional end view of the transducer shown in FIG. 1.

The preferred embodiment of this invention provides transducer apparatus for high density recording on magnetic drums. The transducer includes a single turn secondary conductor around which is wrapped a cupped or U-shaped paramagnetic member through which magnetic flux passes to record on a drum surface. The transducer receives its signals from a drive circuit which provides a current of constant amplitude.

Referring now to FIGS. 1–4, and 6, the transducer 2 comprises a housing 4 in which is mounted a transformer having a two piece magnetic core. These core pieces 6 and 8 mate to enclose the bobbin 10 upon which the primary winding 12 is placed as well as the secondary strap winding 14, of .007 to .010 inch thickness, whose extreme tips are designated 16 and 18. These secondary winding tips are connected by conductor 20 which is placed within the secondary core member 22 which in turn rests in the nonmagnetic support bar 24. Connector 26 provides electrical connection to the drive circuit while threads 28 provide mounting and adjustment means for the transducer. The transducer assembly is mounted proximate the magnetically coated drum 30 so as to facilitate the magnetization of surface portions. By reference to all the figures but most clearly illustrated in FIGS. 1 and 6, when the secondary current flows through conductor 20 a magnetic flux flows around the core member 22 and from one tip of core 22 through the proximate drum surface area 30 to the other tip of the core member. A drum-transducer distance equal to the thickness of the conductor member provides optimum record efficiency.

In the preferred embodiment of the invention the conductor 20 comprised a rectangular strip of copper .001 inch thick and .020 inch wide while the secondary core member constituted grain oriented silicon steel of approximately .001 inch thickness and .030 inch width. Preferred head to drum distance under these conditions is .001 inch. An 8 inch diameter drum at 6000 r.p.m. was utilized with a transducer current of 200–400 milliamperes.

The transducer to drum distance of .001 inch was utilized.

It should be understood that the invention is in no way limited to these dimensions and that other arrangements fall within the scope of this invention. For instance a core, conductor and head to transducer spacing of approximately .000125 inch is regarded as one embodiment of the invention which yields a recording density of 3200 bits/inch, an accomplishment heretofore unrealized by those confronted with the problem of recording.

To assemble, the center tapped primary 12 is wound upon the bobbin 10 and placed within the single turn copper secondary 14. The mating core members are then joined to enclose transformer, the extreme tips 16 and 18 placed to project through a core aperture. The conductor 20 which may be copper, silver or other suitable material is then placed within the core member 22 which is formed to cup the conductor 20 so as to substantially enclose it. The combination of members 20 and 22 may then be placed in the slotted portion of bar 24 and the tips of conductor 20 may then be soldered or otherwise affixed to the tips 16 and 18 of the transformer secondary. Adjustment of mounting bolts in the threads 28 will then facilitate the relative placement of the transducer and the magnetic drum.

Figure 5:
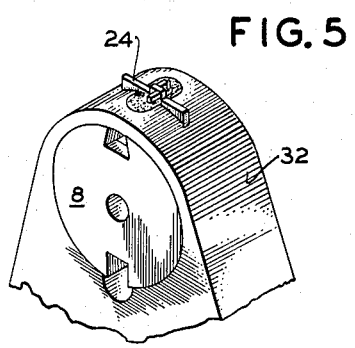
FIG. 5 is a perspective view of another outside configuration for the transducer.
Figure 6:
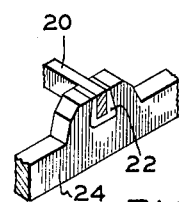
FIG. 6 is a detail view of a portion of the transducer secondary with its cup-shaped core and supporting member.

FIG. 5 illustrates the use of the transducer with a rounded housing 32 which facilitates mounting and at the same time yielding space advantages.

To reiterate, the relatively small sized conductor 20 and core member 22 when arranged in the cup arrangement shown and placed from the drum a distance equal to the conductor and core thickness, provide apparatus capable of recording in the megacycle frequency range thereby greatly increasing the recording density capabilities of magnetic drum systems.

The preferred spacing between the drum surface and the transducer will now be described in relation to FIGS. 10–13. An important feature of the invention is the discovery that optimum recording efficiency and optimum record density is realized when the spacing between the magnetic oxide surface of the drum is spaced from the transducer a distance substantially equal to the thickness of the core material which in turn is substantially equal to the thickness of the conducting material between two portions of the core material.

Figure 10:
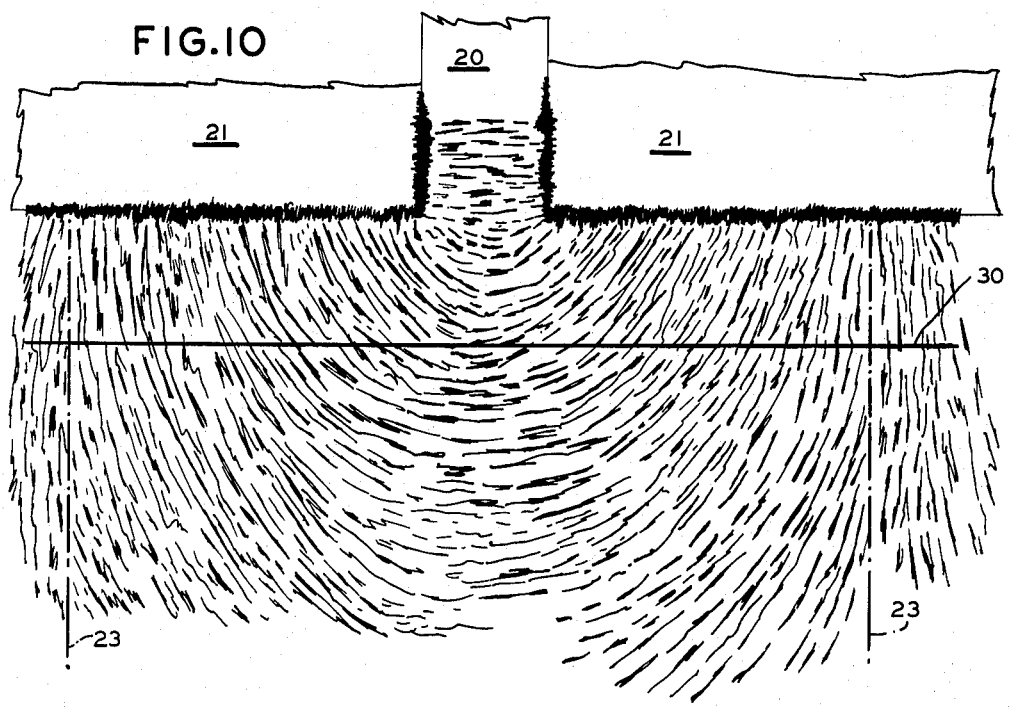
FIG. 10 is a magnetic flux diagram of a conventional ring type record head.

FIG. 10 illustrates the magnetic flux pattern of a conventional ring type record head in which the conductor 20 is bracketed by the poles of the core 21. The drum 30 is spaced from the transducer a distance equal to the thickness of the conductor 20. The relatively large pole surfaces 21 generate a flux pattern which penetrates the drum surface in such a manner to record on the drum a signal or bit which magnetizes a portion of the drum surface marked by the lines 23.

Figure 11:
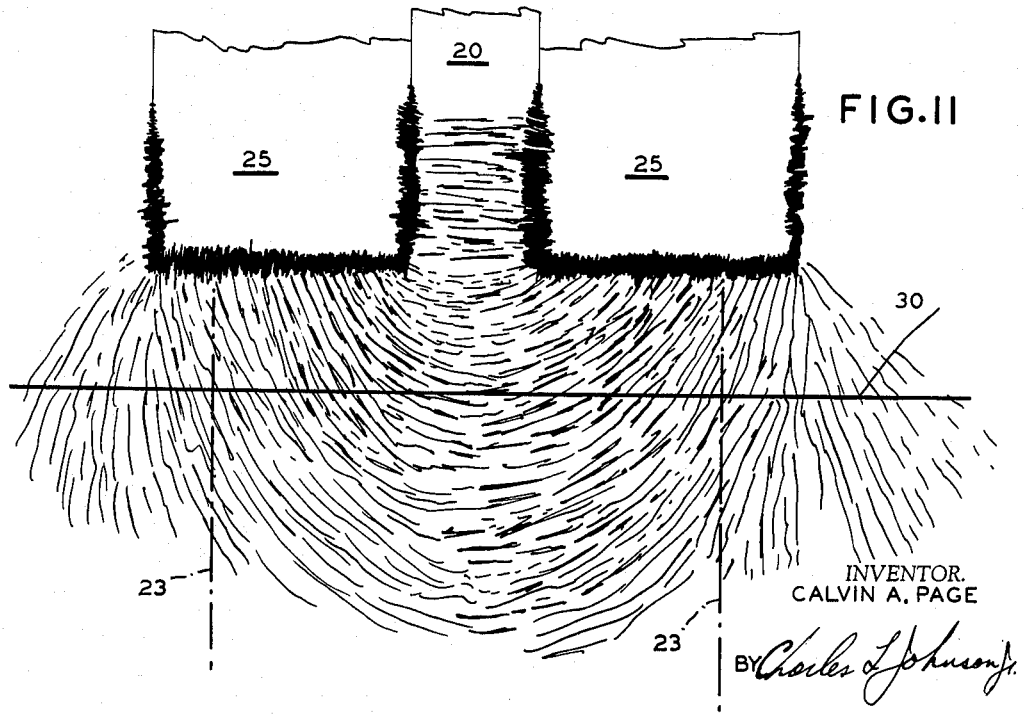
FIG. 11 is a flux diagram of a transducer utilizing a .001 inch conductor and a .002 inch pole piece.

FIG. 11 illustrates a transducer flux path in which the core pieces 25 are twice as thick as the conductor 20. Again the surface distance on the drum 30 which is occupied by the bit is effectively the distance between the vertical flux lines which are extended as lines 23. It is readily seen that each bit takes up less space than the arrangement of FIG. 10.

Figure 12:
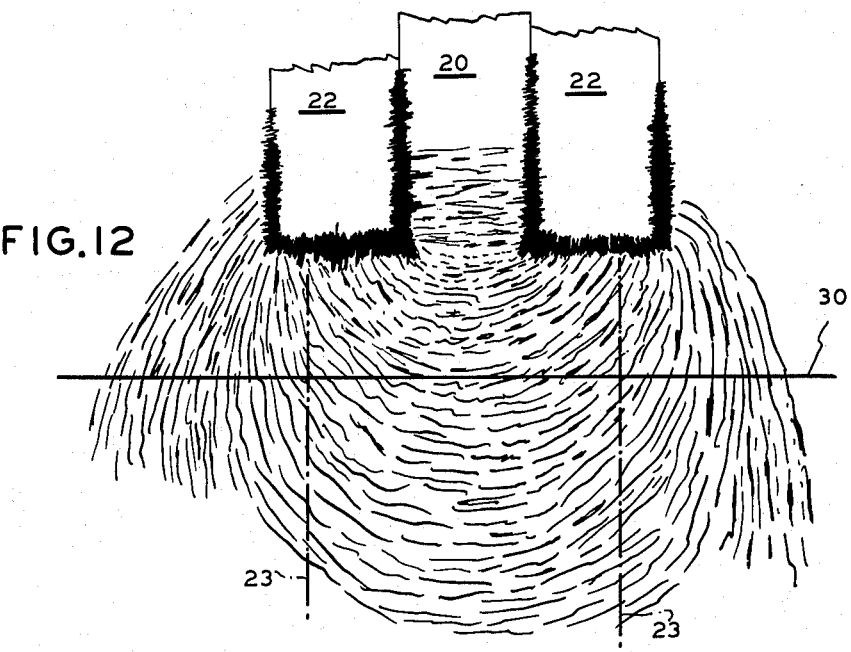
FIG. 12 is a flux diagram of a transducer of the preferred type in which the core and conductor thickness equal the distance between the drum and the transducer.

FIG. 12 illustrates an important feature of the invention in showing the magnetic flux pattern resulting from a transducer having a single turn winding 20 passed between portions of the core 22 in which the conductor and core material thickness is equal to the distance between the drum surface and the transducer. Again the length of the bit or the portion of the drum surface which is effectively occupied by the bit is set off by the construction lines 23. As previously they represent extensions of that point where the magnetic flux enters the drum surface in a perpendicular manner. It is obvious by comparison with FIGS. 10 and 11 that a much greater bit density will be obtained by recording with the apparatus of the FIG. 12 configuration.

Figure 13:
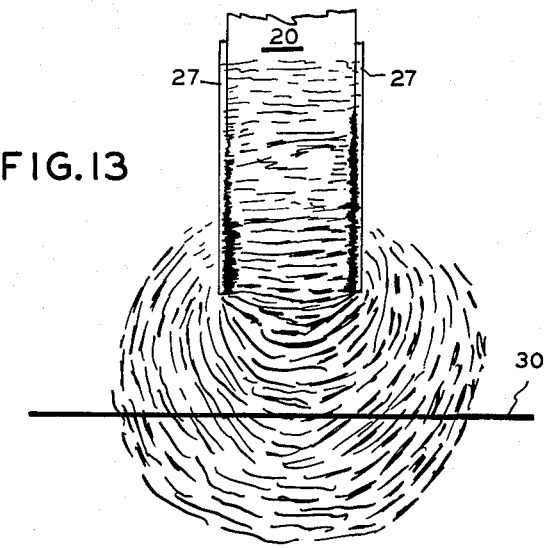
FIG. 13 is a flux diagram of a transducer having a relatively thin core thickness in relation to the conductor.

FIG. 13 carries the reduction a step further in illustrating a conductor around which the relatively thin core material 27 is placed. As may be seen that magnetic flux which does penetrate the drum surface is relatively weak and therefore ineffective for recording. The optimum record arrangement for a high bit density is illustrated in FIG. 12 and this discovery is an important feature of the invention.

It is seen from FIG. 12 that the flux is focused on a relatively small portion of the drum surface. Such an arrangement as described results in a highly selective read or retrieval system wherein magnetized portions of the drum surface induce a signal in the pickup transducer only if the portion is immediately under the pickup head. In other words the apparatus which provides the advantage of high density recording also provides the advantage of high density playback. Large conventional heads have their playback signals distorted, especially at those points where the bit polarity changes, due to the fact that more than one bit is under the pickup head at one time. The device described herein eliminates this disadvantage by its dimensions and spacing.

An improved record circuit is utilized to successfully provide constant current amplitude to the record head at a repetition rate heretofore impractical due to the low bit density.

Figure 7:
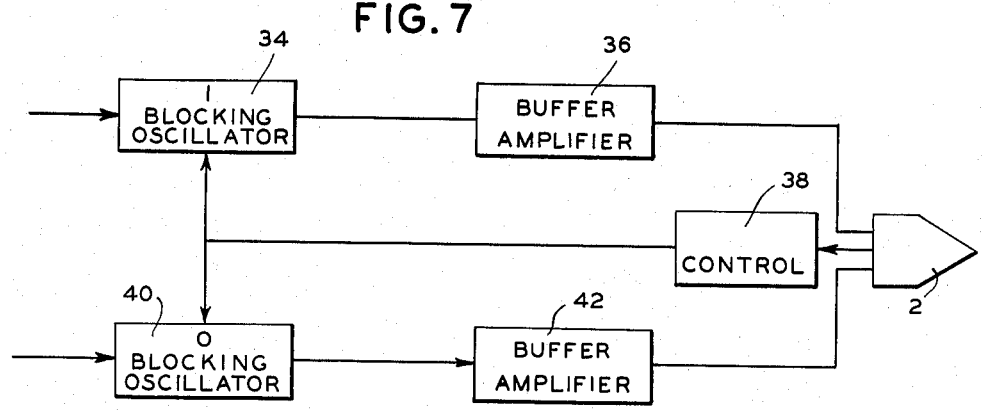
FIG. 7 is a block diagram of the record circuit.
Figure 8:
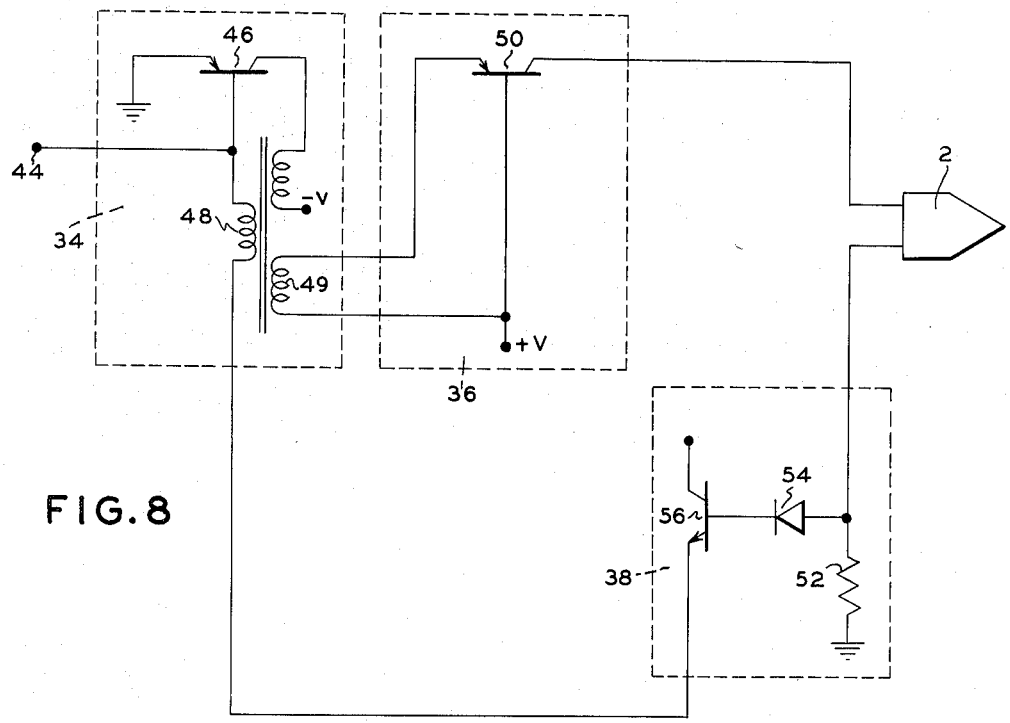
FIG. 8 is a simplified schematic of one side of the record circuit.
Figure 9:
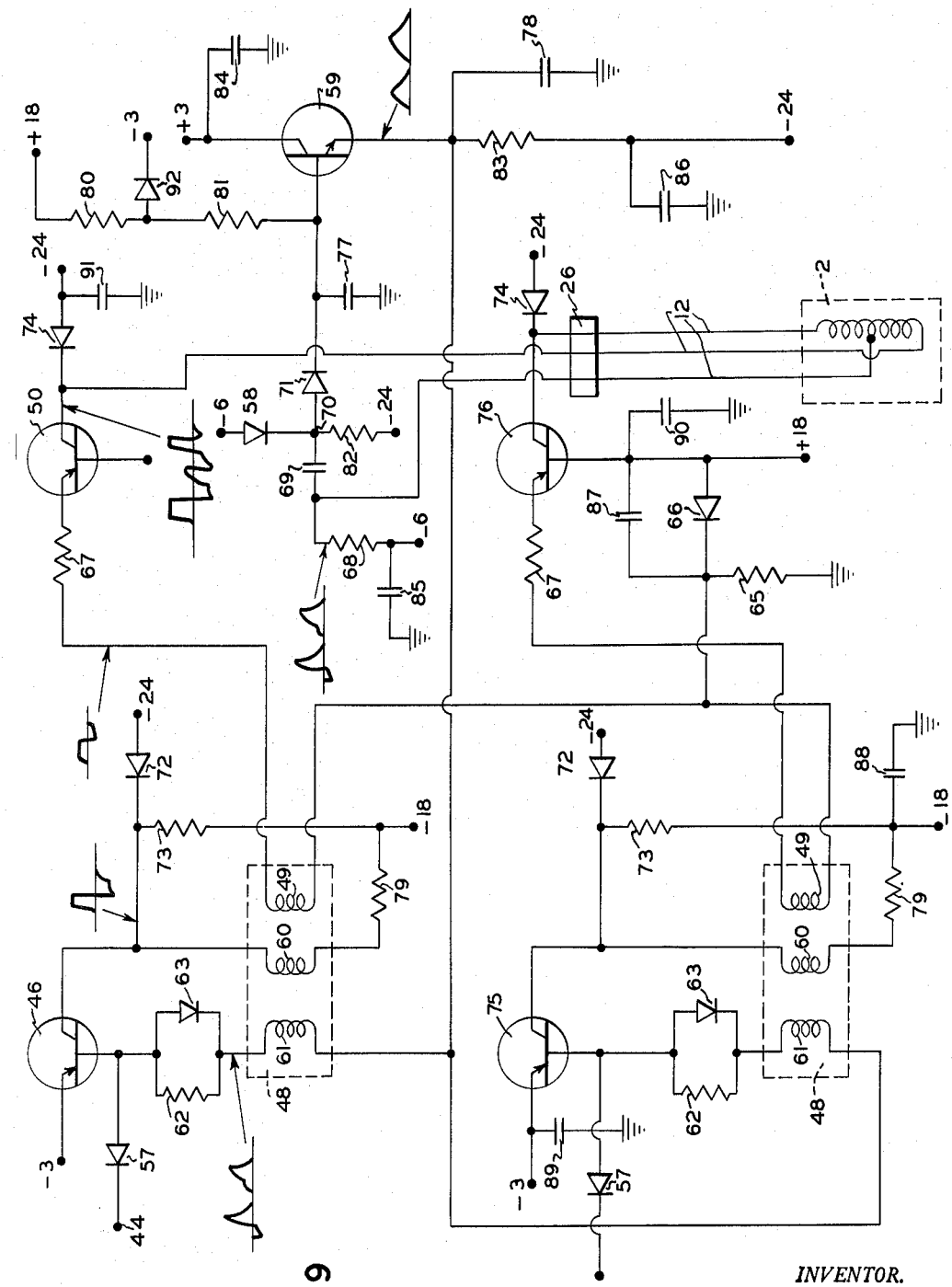
FIG. 9 is a schematic diagram of the record circuit.

Referring now to FIGS. 7, 8, and 9, the operation of the record circuit will be described.

To outline briefly with respect to FIG. 7, if it is desired to record a 1, a negative signal is applied to the blocking oscillator 34 which drives the buffer-amplifier 36 until the current in the write head 2 reaches the preselected value, the current control circuit 38 extinguishes the blocking oscillator 34.

In similar fashion, to write a zero, a negative signal is applied to the blocking oscillator 40 which drives the buffer-amplifier 42 until the current in the write head 2 reaches the same preselected value, at which time the current control circuit extinguishes the blocking oscillator 40. It is thus seen that the current control circuit 38 is shared between 1's and 0's. This of course is possible because simultaneous writing of both never occurs.

A simplified schematic of a portion of the record circuit is illustrated by FIG. 8 and a description of its operation follows.

The circuit arrangement is such that a negative signal on the input conductor 44 will result in a 1 being written on the magnetic drum 30. As the input conductor 44 goes negative it draws current from the base of transistor 46, thereby forward biasing the emitter base region resulting in the conduction of transistor 46. When transistor 46 saturates, the collector voltage goes to zero or ground potential so as to impress —V volts across the primary of transformer 48. The polarity of transformer 48 is such as to cause a negative voltage to appear at the base of transistor 46 thereby sustaining transistor 46 in a saturated region. If the input trigger signal on conductor 44 is now removed the blocking oscillator will remain in the quasi-stable region. The positive voltage at the tertiary winding 49 will force a current into the emitter of transistor 50 causing it to saturate. This results in +V volts being impressed across the record head 2.

Impedance 52 samples the record current. When the potential drop across impedance 52 exceeds the back bias of diode 54, the diode conducts. Upon the conduction of diode 54 the potential across impedance 52 is reproduced at the emitter of transistor 56. When the potential at the emitter of transistor 56 is positive enough to cancel the negative voltage at the secondary of transformer 48, the blocking oscillator transistor 46 shuts off, stopping the drive of transistor 50 which in turn extinguishes the record current.

Referring now to FIG. 9, a more detailed description of the record circuit will be outlined.

Transistor 46 and transformer 48 comprise a blocking oscillator. This oscillator may be D.C. coupled, to the logic circuits of a computer, for the purpose of eliminating time constants and, therefore, unnecessary speed limitations. The emitter of transistor 46 in the preferred embodiment is connected to a potential source of —3 volts. Inasmuch as this represents one half of the amplitude normally used for an input signal, bias of this magnitude allows a noise level of almost three volts to appear at the input conductor 44 without false triggering. When the input signal at conductor 44 is at ground potential, diode 57 is back biased and the blocking oscillator transistor 46 is in its cutoff region. Transistor 46 is back biased by a potential generated by passing a current through diode 92 and transferred to the base of transistor 46 by transistor 59. In a preferred embodiment transformer 48 has a turns ratio of 5:1:1 with winding 60 having the proportion 5. The inductance of winding 60 had 50 microhenries while the winding 61 had 2 microhenries.

As the input trigger signal goes to —6 volts it pulls current through diode 57. The impedance 62 and the diode 63 are in series with winding 61 to prevent triggering current from being shunted away from the transistor 46.

When the triggering current drives the base of transistor 46, the transistor conducts thereby impressing approximately 15 volts across winding 60 of transformer 48.

With fifteen volts across the primary there is induced in winding 61 a voltage pulse of —3 volts. The trigger input on conductor 44 may now be removed and the feedback voltage from the transformer will sustain transistor 46 in a saturated conductive region. The rise time of the voltage at the collector of transistor 46 will normally be in the order of 40 to 60 nanoseconds, a nanosecond being one/one billionth of a second. Rise times of 18 nanoseconds have been realized.

While the transistor 46 is in its quasi-stable region, high currents may be drawn from the tertiary winding 49. Currents as high as one ampere may be drawn from this winding. Because heavy loads on the blocking oscillator deteriorate the rise and fall times, it is desirable to draw minimum current from the transformer.

The buffer-amplifier transistor 50 is a grounded base amplifier and the tertiary winding 49 of transformer 48 must supply all the record current desired plus some additional current as a safety factor. With the type of transducer described herein it is possible to record with currents between 0.050 and 0.300 ampere. Realizing this, it is seen that the winding 49 of transformer 48 must supply between 0.075 and 0.350 ampere.

Impedance 65 draws current through diode 66 to produce a potential which is slightly below +18 volts and this potential during quiescent conditions is applied to the emitter of transistor 50 through the tertiary 49 of transformer 48 and impedance 67. This potential holds the transistor 50 in a reverse bias region.

When the blocking oscillator is in its quasi-stable region winding 49 has a pulse voltage of +3 volts at its terminals with the impedance 67 terminal positive. As a result of this potential a current flows into the emitter of transistor 50. More current is supplied than the collector requires and transistor 50 is forced to saturate. Impedance 67 may be altered in value in accordance with the current requirements of the collector load.

One winding of the record head 2 is placed in the collector circuit of transistor 50. One end of this winding becomes connected through diode 66 to +18 volts when transistor 50 saturates and the other end of the record head is tied to —6 volts through impedance 68 so that the resulting voltage drive on the head is 24 volts.

The primary purpose of resistor 68 is to meter the current through the head. As the current begins to rise in the head a potential is produced across impedance 67. This voltage is directly proportional to the record current. Capacitance 69 couples this potential change to junction 70 which was at approximately —6 volts. When the potential at junction 70 goes positive enough diode 71 begins to conduct. This carries the base of transistor 59, a class A emitter follower, with it. Transistor 59 presents a relatively high input impedance to diode 71 and also transfers any potential at its base to its emitter. As the base of transistor 59 goes positive so does its emitter which is tied to winding 61 of the blocking oscillator transformer 48. When the lower terminal of winding 61 becomes so positive that the upper terminal cannot continue to draw current from the base at transistor 46, the transistor comes out of its saturated condition, and the blocking oscillator shuts off.

The electromagnetic energy accumulated in transformer 48 during the quasi-stable time reverses the potential of winding 49 and drives transistor 50 to the off condition. This inductive kick of transformer 48 also attempts to swing the upper terminal of winding 60 negative. This point however is clamped to —24 volts by way of diode 72. The transformer dissipates its energy into the —24 volt source. Impedance 73 damps the ringing of transformer 48 and prevents false retriggering. Impedance 73 also provides additional noise immunity from all sources.

When transistor 50 becomes back biased and can no longer supply the current desired by the head, the inductive kick of the head goes negative and is clamped to —24 volts by diode 74. The energy stored in the head during its driven period is transferred to the —24 volt supply.

Assuming the operation just described has recorded a "one," the similar operation of transistors 75 and 76 and their associated components would record a "zero." Transistor 59 is shared as a common feedback transistor for both the 1's circuitry and the 0's circuitry.

Capacitors 77 and 78 provide a memory that a recording has just been made. They charge while the current in the head is rising and they discharge between recordings. The time constants in the embodiment described have been optimized for proper operation at 300 kilocycles double pulse.

Impedance 79 is placed in series with the collector winding of transistor 46 to permit monitoring of the collector current and also serve as a fuse in the event of failure of transistor 46 or trigger clamp.

In the preferred embodiment the following component values were successfully utilized:

| Component: | | Value |
|---|---|---|
| 62 | ohms | 560 |
| 73 | do | 2,000 |
| 67, 79 | do | 10 |
| 80 | do | 4,700 |
| 65, 81 | do | 1,000 |
| 82 | do | 10,000 |
| 68 | do | 56 |
| 83 | do | 2,700 |
| 84, 85, 86, 87 | microfarad | 0.1 |
| 88, 89, 90, 91 | do | 0.1 |
| 69 | do | .01 |
| 77 | picofarads | 150 |
| 78 | do | 470 |
| 57, 58 | | 1N636 |
| 63 | | 1N2561 |
| 72, 74 | | 1N773 |
| 92 | | PS005 |
| 71 | | LD73 |
| 66 | | 1N91 |
| 46, 50 | | 2N644 |
| 75, 76 | | 2N1224 |
| 59 | | 2N585 |
| 48 | | S18800 |

It can thus be understood from the above description of operation that nonlinear negative feedback is used to control the pulse width of a regenerative circuit or blocking oscillator. This provides for a very simple means of generating amplitude controlled pulses of current in an inductor. Inasmuch as the current metering resistor may be selected to provide any reasonable head current and since the turn-off circuitry controls both sides of the circuit the arrangement may be seen to act as an automatically controlled inductor driver.

From the foregoing it is seen the invention described provides a record method and apparatus capable of high density recording on magnetic drums. The system includes improved drive circuitry as well as unique transducer head construction which provides the means for accomplishing the invention objects stated previously.

It should be understood that this invention is not limited to the specific details of construction and arrangement thereof herein illustrated, and that changes and modifications may occur to one skilled in the art without departing from the spirit of the invention; the scope of the invention being set forth in the following claims.

What is claimed is:

1. A record system comprising a record member, circuit means, and a transducer responsive to the circuit means and mounted proximate the record member whereby the said circuit signals are recorded upon the record member, the circuit means including a feedback voltage responsive to the record current for extinguishing the record current.

2. Record apparatus comprising a record member, circuitry means, and transducer means connected to the said circuitry and mounted proximate the said record member whereby the circuit signals are recorded, the said circuitry means including regenerative circuit means for generating a signal pulse, output amplifier means, buffer means, and record current control means whereby the amplitude of the current through the transducer means is maintained constant.

3. The apparatus of claim 2 wherein the regenerative circuit means includes a pulse transformer arranged in a blocking oscillator configuration and connected to the said record current control means so that upon the existence of the desired record current a potential is generated to cancel the potential at the blocking oscillator to thereby extinguish the record current.

4. The apparatus of claim 3 wherein the buffer means interconnects the said regenerative circuit means with the said transducer means whereby each of the two circuits are isolated from the electrical conductive effects of the other.

5. The apparatus of claim 4 wherein the record current control means includes sampling means for determining the current through the record head and conductive means responsive to said sampled current for allowing an extingiushing signal to pass to the regenerative circuit upon the occurrence of excess current whereby the regenerative circuit is extinguished and in turn the record current is extinguished.

6. The method of high density recording comprising forming a tranducer by cupping a core member of given thickness around a secondary conductor member of substantially equal thickness, causing relative movement between the transducer and a magnetic surface, placing the transducer a distance from the magnetic surface substantially equal to the thickness of the core and secondary conductor members and passing a signal through the secondary member so as to cause magnetic flux to flow from one tip of the core member through a portion of the rotative magnetic surface and back to the other core tip.

7. The method of high density playback of recorded information comprising forming a transducer by cupping a core member of given thickness around a conductor member of substantially equal thickness, causing relative movement between the transducer and a magnetic record surface of which portions have been magnetized, and placing the transducer a distance from the magnetic surface substantially equal to the thickness of the core and conductor member so as to induce a signal in the conductor responsive to the passage of the magnetized record surface portion proximate the transducer.

8. Record and playback transducer means for use with magnetic drum record means comprising a transformer having a single turn secondary a portion of which is of rectangular cross-section and a cup-shaped core material member arranged to substantially encompass a portion of the said secondary proximate the surface of the magnetic drum record means, the thickness of the secondary and the thickness of the core member being substantially equal to each other and substantially equal to the spacing between the drum and the transducer means.

9. The apparatus of claim 8 wherein the said thicknesses and spacing are between .000125 and .0015 inch.

10. A high density record system comprising a record member upon which information is to be recorded, circuit means for generating electrical signals indicative of the information to be recorded upon the said record member, and transducer means mounted proximate the record member and connected to the output of the circuit means whereby input signals to the circuit means effect recording upon said record member, the said transducer means including a transformer having a single turn secondary and a core material member arranged to substantially encompass a portion of the said secondary winding proximate the surface of the record member, the thickness of the secondary and the thickness of the core member being substantially equal to each other and substantially equal to the spacing between the record member and the transducer means.

11. The apparatus as defined in claim 10 wherein the circuit means includes a feedback portion for limiting the current through the transducer.

12. The apparatus of claim 10 wherein the said thickness and spacing is between .000125 and .0015 inch.

(References on following page)

References Cited by the Examiner

UNITED STATES PATENTS

| | | | |
|---|---|---|---|
| 2,854,525 | 9/1958 | Quade | 179—100.2 |
| 2,936,444 | 5/1960 | Hieten | 340—174.1 |
| 2,941,045 | 6/1960 | Connell | 179—100.2 |
| 2,947,592 | 8/1960 | Naiman et al. | 346—74 |
| 2,950,464 | 8/1960 | Hinton et al. | 340—174.1 |
| 2,967,750 | 1/1961 | Koren et al. | 346—74 |
| 2,969,525 | 1/1961 | Hill | 340—174.1 |
| 3,124,788 | 3/1964 | Ricketts et al. | 179—100.2 X |

IRVING L. SRAGOW, *Primary Examiner.*

R. M. JENNINGS, H. D. VOLK, *Assistant Examiners.*